H. P. ARNOLD.
PROCESS OF MANUFACTURING CUTTING TOOLS.
APPLICATION FILED JULY 17, 1919.

1,339,152.

Patented May 4, 1920.

Inventor.
Howard P. Arnold
by Heard Smith & Tennant.
Attys.

UNITED STATES PATENT OFFICE.

HOWARD P. ARNOLD, OF ROCKLAND, MASSACHUSETTS.

PROCESS OF MANUFACTURING CUTTING-TOOLS.

1,339,152.   Specification of Letters Patent.   Patented May 4, 1920.

Application filed July 17, 1919. Serial No. 311,599.

*To all whom it may concern:*

Be it known that I, HOWARD P. ARNOLD, a citizen of the United States, residing at Rockland, county of Plymouth, State of Massachusetts, have invented an Improvement in Processes of Manufacturing Cutting-Tools, of which the following description, in connection with the accompanying drawing, is a specification, like characters on the drawings representing like parts.

This invention relates to an improved process of manufacturing cutting tools such for example as milling cutters.

The object of the invention is to provide a process by which such tools can be economically and efficiently manufactured and in which the cutter blades will be held firmly in place.

The object of the invention is further to provide a process in which a minimum amount of brazing material is employed and in which the brazing material is inserted in the cutter before it is placed in its seat.

These and other objects and features of the invention will appear more fully from the accompanying description and drawings and will be particularly pointed out in the claim.

The drawings illustrate, as an exemplification of the process, a milling cutter and the main steps of the process or method of manufacturing.

In the drawings—

In a prior Patent No. 1,290,042 granted to me January 7, 1919, I have illustrated and described a process of manufacturing cutting tools by the use of a small amount of brazing material fusible at or below the temperature required to harden the blades and inserted between the cutter blades and the seats during the process of forming the tool.

The present invention in some respects is an improvement over that disclosed in my prior patent and especially in connection with some types of tools simplifies the process of brazing.

The process of this invention is applicable to various types of tools wherein the hardened cutter blades are formed separately from the body of the tool. An ordinary type of milling cutter is illustrated as an exemplification of the invention.

In the process of manufacturing a cutting tool, such as a milling cutter, in accordance with this invention the body 1 of the tool is first formed by the usual operations. Cutter blade seats 2 are formed in the periphery of the body of a size and shape to conform to the cutter blades. The metal between the cutter blades is preferably cut away or backed off at 3 to form the necessary clearance. The various steps employed in forming the body of the tool with the cutter blade seats and backed off portions 3 may be performed according to any of the usual methods and while the forming of the body of the tool and the forming of the cutter blade seats therein are characterized for convenience as the first and second steps of the process, they may be formed in any convenient manner.

Figure 1:
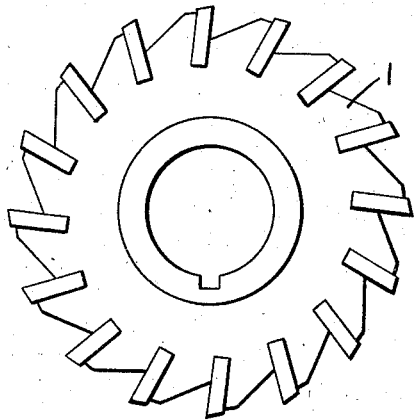
Figure 1 is a side elevation of a completed milling cutter made in accordance with the process of this invention.
Figure 2:
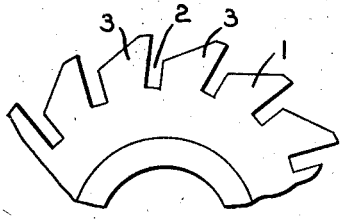
Fig. 2 is a view in side elevation of a portion of the body of the tool shown in Fig. 1.
Figure 3:
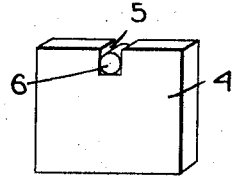
Fig. 3 is a view in perspective of one of the cutter blades with the brazing material in place ready for insertion in the body of the tool.

The third step of the process consists in forming the cutter blades 4 which in the case of milling cutters of the type shown in Fig. 1 are small rectangular blocks of steel.

The fourth step of the process consists in forming recesses 5 in the bottoms of the cutter blades to receive the required amount of brazing material which must be fusible at or below the temperature required to harden the cutter blades. Any suitable brazing material such for example as copper may be employed. Preferably the required amount of brazing material is presented as a small section 6 of copper wire and the recesses 5 are milled or cut into the bottoms of the cutter blades and of just the size to hold the section of copper wire 6 snugly in place. The size of the section of the copper wire 6 and consequently the recess 5 will be governed by the amount of brazing material found to be necessary, but it will in any event be small.

The fifth step of the process consists of inserting into the recess 5 this small amount of brazing material preferably in the form of a section of copper wire 6.

The sixth step of the process consists in placing the cutter blades with the inserted brazing material in the seats 2 previously formed in the body of the tool.

Figure 4:
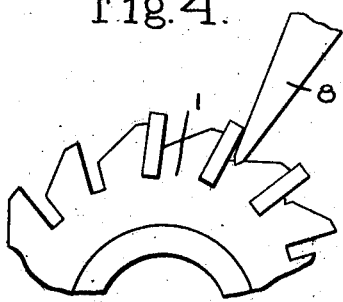
Fig. 4 is a view in end elevation of a portion of the body of the tool showing some of the cutter blades in place and showing the method of upsetting the body to hold the cutter blades during the brazing operation.

If the cutter blades do not fit snugly in the body of the tool they may be held in place in any suitable manner. Preferably this is done by upsetting the body of the tool at points adjacent the blades so as to retain the blades in place. This upsetting may be done by the use of a tool 8 as indicated in Fig. 4.

The seventh step of the process consists in heating the tool to the proper temperature required for hardening the blades which may be done in any suitable manner. This step simultaneously effects the melting of the brazing material inclosed between the cutter blades and the seats in the recesses 5 and causes the brazing material to flow by capillary attraction between the blades and seat walls. During this step of the process the tool may be rotated to cause gravity to assist in the flow of the brazing material. The amount of brazing material can thus be adjusted so that a minimum amount will flow out or exude upon the surface of the body and thus render unnecessary or minimize the amount of finishing required to remove any excess of brazing material.

The eighth step of the process consists of cooling the tool in any suitable manner properly to harden the blade.

The final steps of the process are not particularly concerned to the present invention, involve the proper finishing of the tool and may be all performed by well known and usual operations.

Having thus described my invention what I claim as new and desire to secure by Letters Patent is—

The process of manufacturing a cutting tool which consists in first forming the body of the tool; second, forming cutter blade seats therein; third, forming the cutter blades to fit said seats; fourth, forming recesses in the bottoms of the cutter blades; fifth, inserting in said recesses small amounts of brazing material fusible at or below the temperature required to harden the blades; sixth, placing said cutter blades with the inserted brazing material in said seats; seventh, heating the tool to a proper temperature for hardening the blades and thereby melting the brazing material and causing it to flow by capillary attraction between said blades and seat walls; and eighth, in cooling the tool.

In testimony whereof, I have signed my name to this specification.

HOWARD P. ARNOLD.